US008784125B2

(12) United States Patent  (10) Patent No.: US 8,784,125 B2
Hoang  (45) Date of Patent: Jul. 22, 2014

(54) SIDE RETAINER ASSEMBLY FOR HEAT SINK AND MEMORY MODULES

(75) Inventor: Phan F Hoang, Rancho Santa Margarita, CA (US)

(73) Assignee: Virtium Technology, Inc., Rancho Santa Margarita, CA (US)

( * ) Notice: Subject to any disclaimer, the term of this patent is extended or adjusted under 35 U.S.C. 154(b) by 59 days.

(21) Appl. No.: 13/535,309

(22) Filed: Jun. 27, 2012

(65) Prior Publication Data

US 2014/0004731 A1 Jan. 2, 2014

(51) Int. Cl.
*H01R 4/50* (2006.01)
*H05K 7/20* (2006.01)

(52) U.S. Cl.
USPC .......................................... 439/345; 361/715

(58) Field of Classification Search
USPC ............ 439/345, 326–330, 152–160, 607.31, 439/59–64, 79, 260, 267, 352, 353; 361/715, 679.47, 679.54, 747, 748
See application file for complete search history.

(56) References Cited

U.S. PATENT DOCUMENTS

| | | | | |
|---|---|---|---|---|
| 5,827,085 A * | 10/1998 | Yodogawa | | 439/326 |
| 6,796,825 B2 * | 9/2004 | Wang | | 439/326 |
| 7,661,973 B2 * | 2/2010 | Lee et al. | | 439/326 |
| 8,523,603 B2 * | 9/2013 | Yamaji et al. | | 439/493 |
| 2007/0042629 A1 * | 2/2007 | Okano | | 439/345 |

* cited by examiner

*Primary Examiner* — Renee Luebke
*Assistant Examiner* — Harshad Patel
(74) *Attorney, Agent, or Firm* — Phan F Hoang.

(57) ABSTRACT

A side clip has a clip base attached to a socket connector and a first clip member and a second clip member extending from the clip base. The first clip member has a terminal for attaching to a printed circuit board. The second clip member is spaced in parallel from the first member and connected to the first clip member by a distal segment to form an opening. A side retainer has a retainer base having first and second ends and first, second, third, and fourth retainer members extending vertically from the retainer base. The first retainer member fits a hole on a board held by the side clip. The second retainer member is located at the first end and has an inward hook. The fourth retainer member is located on the second end and has an outward hook.

8 Claims, 14 Drawing Sheets

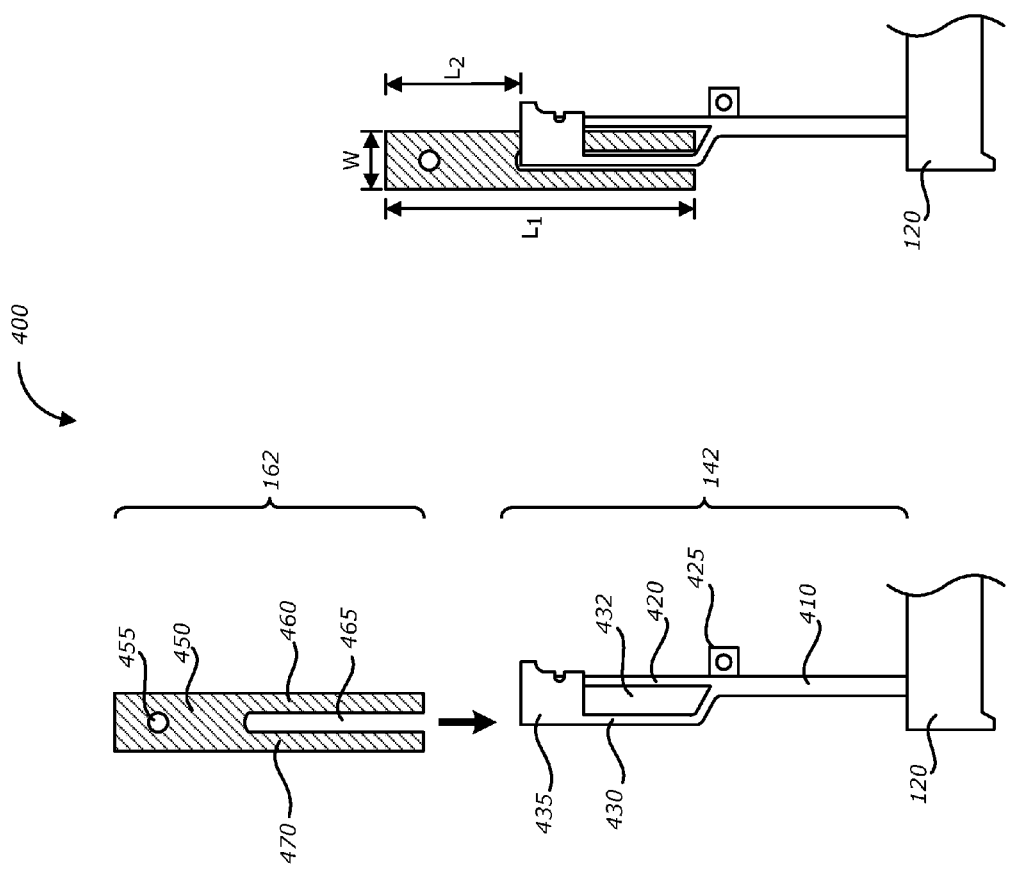

SIDE RETAINER ASSEMBLY FOR HEAT SINK AND MEMORY MODULES

TECHNICAL FIELD

The presently disclosed embodiments are directed to the field of memory modules, and more specifically, to heat sinks and attachment assembly for memory modules.

BACKGROUND

Memory modules have been increasingly used in microprocessor-based systems including military, industrial, and consumer products. Computer products may now pack extremely high density memory devices that occupy only a very small footprint on a printed circuit board. Memory devices such as double data rate (DDR) synchronous dynamic random access memory (SDRAM) exist at various versions (e.g. DDR, DDR1, DDR2, DDR3, and DDR4) at density as high as 4 Gb operating at frequencies up to 30 GHz. Low voltage memory devices are also readily available for lower power consumption. Typical DDR3 devices can now operate at 1.35V at a clock rate of 933 MHz. However, as demands for high density memory modules increase, more and more memory devices are packed on memory modules operating at higher and higher clock frequencies, leading to higher power consumption. High power consumption typically generates heat which may reduce component life and cause component failures. Accordingly, a proper thermal management is typically required for high performance memory modules. This may be done efficiently by a heat sink.

Existing techniques to provide heat sinks for memory modules have a number of drawbacks. Most existing techniques are inefficient by providing heat dissipation separately on both sides of the memory modules. For memory modules installed on printed circuit boards in a horizontal position, the top and the bottom surfaces of a memory module face different mechanical spacing. For example, the bottom surface typically faces a very confined space, essentially trapping the dissipated heat within the space below the memory module. In addition, in many applications, mechanical stability of the memory modules and associated heat sinks are necessary. Existing techniques do not provide adequate attachment assemblies to secure the heat sinks and the memory modules firmly to the connectors and/or the printed circuit board.

SUMMARY

One disclosed feature of the embodiments is a technique to provide a side retainer assembly for a memory module with a heat sink A side clip has a clip base attached to a socket connector and a first clip member and a second clip member extending from the clip base. The first clip member has a terminal for attaching to a printed circuit board. The second clip member is spaced in parallel from the first member and connected to the first clip member by a distal segment to form an opening. A side retainer has a retainer base and first, second, third, and fourth retainer members extending vertically from the retainer base. The first retainer member fits a hole on a board held by the side clip. The second retainer member is located at a first end of the retainer base and has an inward hook to hook onto side end of the clip base. The fourth retainer member is located on a second end of the retainer base and has an outward hook to hook onto the distal segment of the side clip.

BRIEF DESCRIPTION OF THE DRAWINGS

Embodiments may best be understood by referring to the following description and accompanying drawings that are used to illustrate embodiments. In the drawings:

FIG. 4A is a diagram illustrating a side lock assembly in separate components according to one embodiment.

FIG. 4B is a diagram illustrating a side lock assembly in fully inserted state according to one embodiment.

DETAILED DESCRIPTION

One disclosed feature of the embodiments is a technique to provide a side retainer assembly for a memory module with a heat sink A side clip has a clip base attached to a socket connector and a first clip member and a second clip member extending from the clip base. The first clip member has a terminal for attaching to a printed circuit board. The second clip member is spaced in parallel from the first member and connected to the first clip member by a distal segment to form an opening. A side retainer has a retainer base and first, second, third, and fourth retainer members extending vertically from the retainer base. The first retainer member fits a hole on a board held by the side clip. The second retainer member is located at a first end of the retainer base and has an inward hook to hook onto side end of the clip base. The fourth retainer member is located on a second end of the retainer base and has an outward hook to hook onto the distal segment of the side clip.

In the following description, numerous specific details are set forth. However, it is understood that embodiments may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Figure 1:
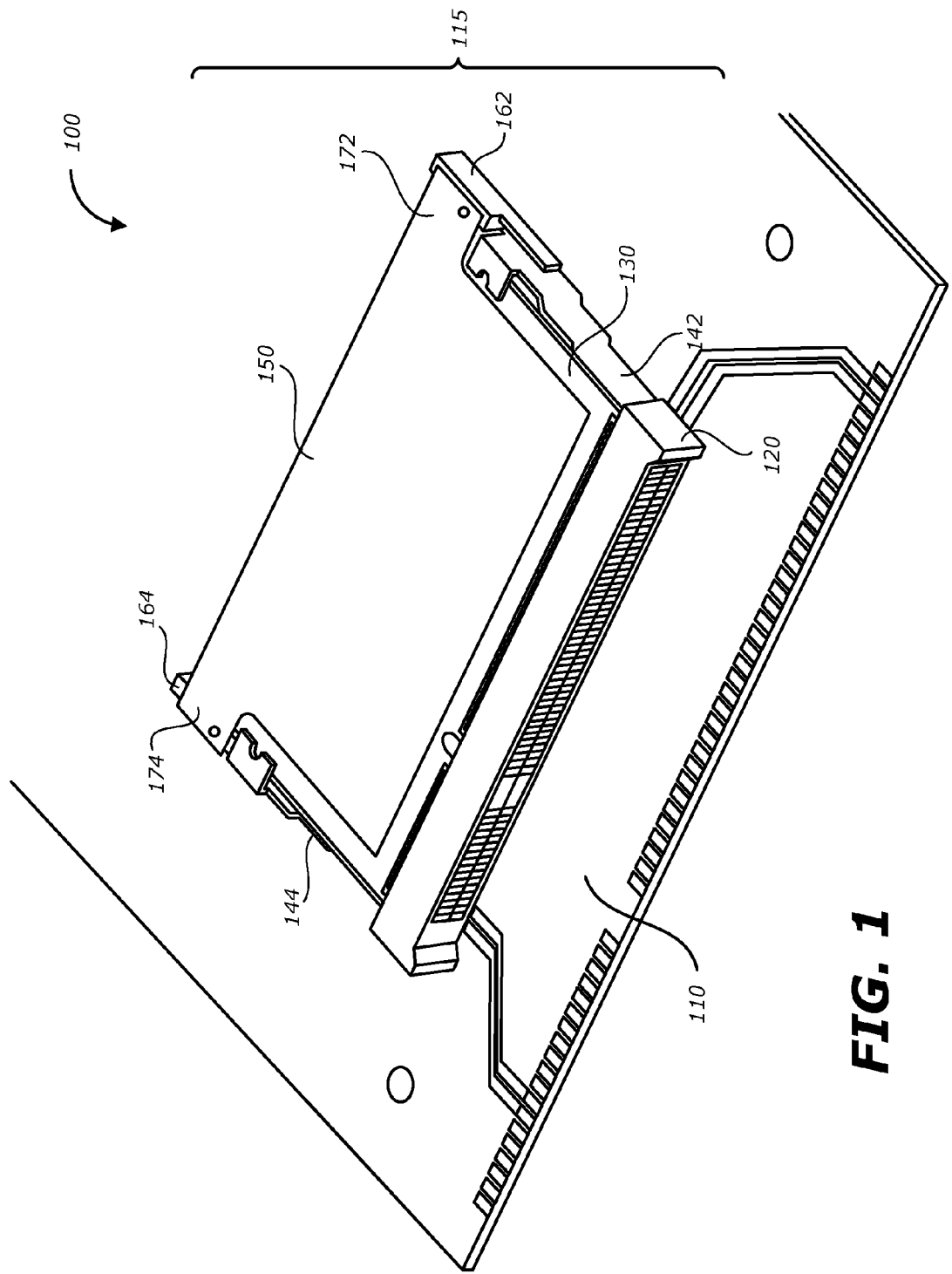
FIG. 1 is a diagram illustrating a system according to one embodiment.

FIG. 1 is a diagram illustrating a system 100 according to one embodiment. The system 100 includes a printed circuit board (PCB) 110 and a board assembly 115. The board assembly 115 includes a socket connector 120, a memory module 130, two side clips 142 and 144, a heat sink 150, and two side locks 162 and 164. The system 100 may include more or less than the above elements.

The PCB 110 may be any PCB that is populated with electronic components. The PCB 110 may be used in a computer system, a laptop computer, a server, a workstation, or any system that may use memory modules as part of the system memory. The socket connector 120 is attached on the PCB 110 by soldering. The socket connector 120 may be any connector that is suitable for connecting memory modules.

The memory module 130 is inserted into the socket connector 120 so that it is firmly secured in a position that is typically parallel to the surface of the PCB 110. The memory module 130 may be any suitable memory modules, including small outline dual in-line memory module (SO-DIMM), Mini-DIMM, very low profile (VLP) Mini-DIMM. In one embodiment, the memory modules have memory components populated on both sides of the printed circuit board that carries the memory devices.

The two side clips 142 and 144 are inserted at two ends of the socket connector 120 to secure or guide the memory module 130. By holding the memory module 130 on its two sides, the memory module 130 may be kept in place and resist against vibrations or shaking actions. In one embodiment, the two side clips 142 and 144 may provide a spring action sideways to provide a snap-on action when the memory module is inserted into the socket connector 120. In one embodiment, the memory module 130 is initially inserted in the socket connector 120 at a slanted angle. It may be then pressed down to fit firmly in the connector 120 at a horizontal position with respect to the PCB 110. As it is pressed down, the force acting upon it may press on the tips of the side clips 142 and 144 so that the spring force provides a snap-on action, holding the memory module 130 firmly in place.

The heat sink 150 covers the memory module 130 by sliding it from the opposite side of the socket connector 120 after the memory module 130 is firmly inserted into the socket connector 120. The heat sink 150 extends the contact to both top and bottom surface of the memory module 130, therefore increases the heat dissipation, resulting in an efficient thermal management for the memory module 130.

The two side locks 162 and 164 provide a means to further secure the heat sink 150 to the side clips 142/144 to improve the mechanical stability. The two side locks 162 and 164 may be optional where this mechanical stability is not necessary or where there is another mechanism to hold the memory module firmly. The two side locks 162 and 164 are secured to the side clips 142/144 by mechanical fasteners (e.g., screws). In one embodiment, the two side locks 162 and 164 lock to the corresponding two side clips 142 and 144 to further reinforce the mechanical stability of the structure.

Figure 2:
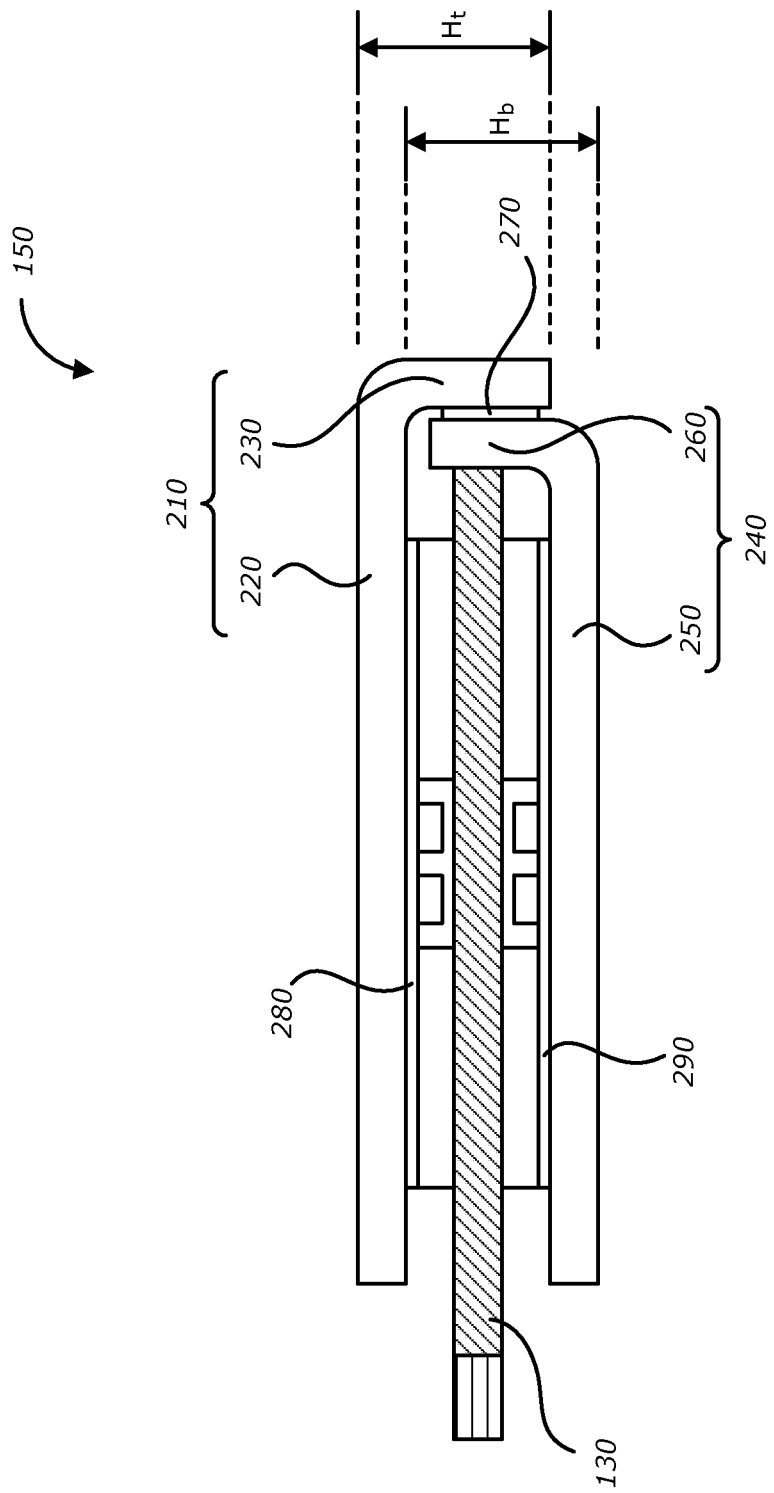
FIG. 2 is a diagram illustrating a heat sink according to one embodiment.

FIG. 2 is a diagram illustrating the heat sink 150 according to one embodiment. The heat sink 150 includes a top element 210 and a bottom element 240. The terms "top" and "bottom" do not necessarily refer to the absolute position of being on the top or being at the bottom. They are merely used to refer to the relative position of these elements.

The top element 210 includes a first portion 220 and a second portion 230. Both portions 220 and 230 are integral to each other. The portions may be formed from the top element 210 by bending one portion to form an angle with respect to the other portion. The angle is approximately 90 degrees. The first portion 220 has an area that may cover a substantial top surface of the memory module 130 (FIG. 1). Typically, this substantial area may be approximately equivalent to 70% to more than 100% of the top surface of the memory module. The second portion 230 may be bent at an angle that is substantially perpendicular to the first portion 220. This angle may range from 80 degrees to 100 degrees. The height $H_t$ of the second portion may be approximately equal to the thickness of the memory module including the populated components. In one embodiment, this height $H_t$ may be 0.117 inch±0.005 inch (or 2.97 mm±0.127 mm). The top element 210 may have a thickness between 0.2 mm and 1.0 inclusive. In one embodiment, the top element 210 may have a thickness of approximately 0.020 inch±0.002 inch (or 0.508 mm±0.0508 mm).

The bottom element 240 may be similar to the top element 210. It includes a third portion 250 and a fourth portion 260. Both portions 250 and 260 are integral to each other. The portions may be formed from the bottom element 240 by bending one portion to form an angle with respect to the other portion. The angle is approximately 90 degrees. The third portion 250 has an area that may cover a substantial bottom surface of the memory module 130 (FIG. 1). Typically, this substantial area may be approximately equivalent to 70% to more than 100% of the bottom surface of the memory module. The fourth portion 260 may be bent at an angle that is substantially perpendicular to the third portion 250. This angle may range from 80 degrees to 100 degrees. The height $H_b$ of the second portion may be approximately equal to the thickness of the memory module including the populated components. In one embodiment, this height $H_t$ may be 0.117 inch±0.005 inch (or 2.97 mm±0.127 mm). The bottom element 240 may have a thickness between 0.2 mm and 1.0 inclusive. In one embodiment, the top element 210 may have a thickness of approximately 0.020 inch±0.002 inch (or 0.508 mm±0.0508 mm).

To provide good heat dissipation, the top and the bottom elements 210 and 240 may be typically made of materials having high bulk thermal conductivity, typically ranging from 120 W/(m·K) to 400 W/(m·K) (e.g., copper). In one embodiment, one of the top and the bottom elements 210 and 240 may be made of one of copper, aluminum, and an alloy including aluminum or copper.

The top element 210 and the bottom element 240 are attached to each other by an adhesive layer 270. Similarly, the bottom surface of the first portion 220 may be attached to the top surface of the memory module 130 by an adhesive layer 280; the top surface of the third portion 250 may be attached to the bottom surface of the memory module 130 by an adhesive layer 290. The adhesive material typically has high viscosity, aging resistance, and is resistant to high temperature.

The attachment of the top and bottom elements 210 and 240 results in an inverted C-shaped heat sink that covers the memory module 130. The heights $H_t$ and $H_b$ may be selected such that the memory module 130 may fit comfortably within the resulting C-shaped heat sink In addition, the contact area between the second portion 230 and the fourth portion 260 is selected such that the bonding of the top and bottom elements 210 and 240 is mechanically and thermally stable. The contact area of the two elements formed by the bonded second portion 230 of the top element 210 and the fourth portion 260 of the bottom element 240 provides rigidity to the heat sink 150. In addition, this area also allows efficient heat transfer from the bottom surface of the memory module 130 to the top element 210. This efficient heat transfer is particularly important for structure that has components populated on both sides such as memory modules like the memory module 130.

In one embodiment, the first portion 220 of the top element 210 has two lips 172 and 174 (FIG. 1) jutting near the second portion 230. These two lips 172 and 174 have holes that correspond to holes of the two side locks 162 and 164 so that mechanical fasteners (e.g., screws) may be inserted through to secure the top element 210, and thus the entire heat sink 150, to the side clips 142/144. It should be noted that if securing directly side clips 142/144 is not desired, either because such a mechanical stability is not needed or because there is another mechanism to provide such a mechanical stability, the two lips 172 and 174 are not needed.

Figure 3:
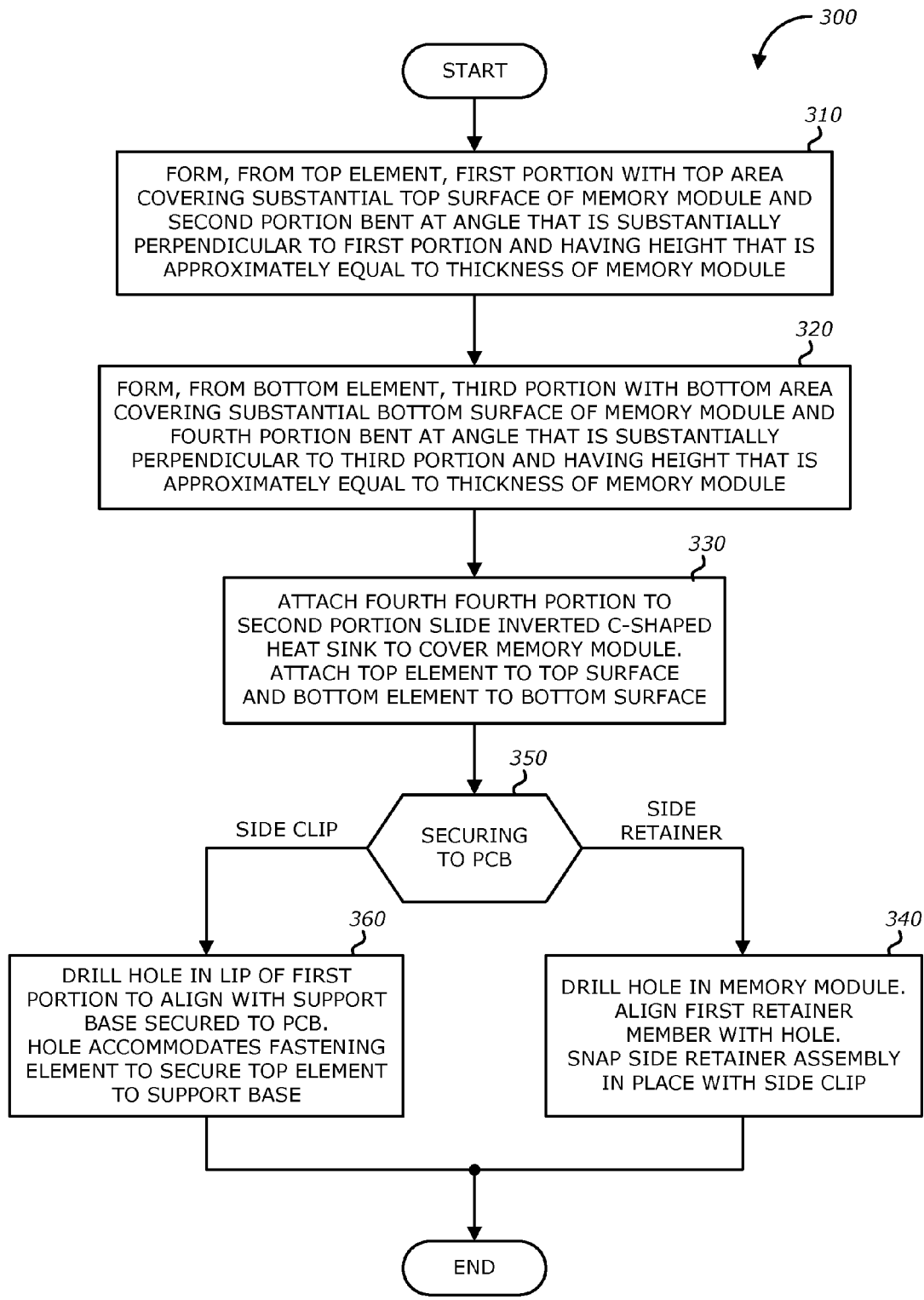
FIG. 3 is a flowchart illustrating a process to form the heat sink according to one embodiment.

FIG. 3 is a flowchart illustrating a process 300 to form the heat sink according to one embodiment.

Upon START, the process 300 forms, from a top element, a first portion and a second portion (Block 310). The first portion has an area, referred to as top area to distinguish from the bottom area of the bottom element, covering a substantial top surface of a memory module. The second portion is bent at an angle that is substantially perpendicular to the first portion and has a height that is approximately equal to thickness of the memory module. Next, the process 300 forms, from a bottom element, a third portion and a fourth portion (Block 320). The third portion has an area, referred to as bottom area to distinguish from the top area, covering a substantial bottom surface of the memory module and a fourth portion bent at an angle that is substantially perpendicular to the third portion and having a height that is approximately equal to the thickness of the memory module.

Then, the process 300 attaches the fourth portion to the second portion (Block 330) to form an inverted C-shaped heat sink. This may be performed by applying adhesive to the outside surface of the fourth portion or the inside surface of the second portion if the fourth portion faces the memory module and the second portion attaches the fourth portion from the outside. Alternatively, the adhesive may be applied to the outside surface of the second portion or the inside surface of the fourth portion if the second portion faces the memory module and the fourth portion attaches to the second portion from the outside.

Next, the process 300 slides the inverted C-shaped heat sink to cover the memory module (Block 340). This may be performed by attaching the first portion of the top element to the top surface of the memory module and the third portion of the bottom element to the bottom surface of the memory module. The attachment may be performed by applying adhesive.

Then, the process 300 secures the heat sink and the memory module to the PCB and/or the socket connector (Block 350). There are at least two ways to do this: one is using the side lock assembly and one is using the side retainer assembly described below. If a side lock assembly is desired, the process 300 drills holes in two lips of the first portion to align with two side locks secured to two side clips (Block 360). The holes accommodates fastening elements (e.g., screws) to secure the top element to the side locks. The process 300 is then terminated. If a side retainer assembly is desired, the process 300 drills holes on two sides of the memory module, aligns the first retainer member of the side retainer assembly (described below) with the holes, and snaps the side retainer assemblies with side clips (Block 370). The process 300 is then terminated.

Side Lock Assembly

The two pairs of side clips 142/144 and side locks 162/164 form side lock assemblies that secure the heat sink 130 to the socket connector 120 via the side clips 142/144. The side lock assembly is easy to install and requires no soldering on the PCB 110. The side lock assembly may provide mechanical reinforcement to the heat sink 150 and the memory module 130 without utilizing real estate on the PCB 110. This may reduce potential real estate conflicts due to the high density of the components on the PCB 110. The side lock assembly also avoids additional mounting holes on the memory module 130 which may render the memory modules non-standard due to consideration for the routing of signals and the presence of mounting holes on the board of the memory module 150 that contains the memory devices.

FIG. 4A is a diagram illustrating a side lock assembly 400 in separate components according to one embodiment. In the following, for brevity and clarity, only the pair including the side clip 142 and the side lock 162 is described. The pair including the side clip 144 and the side lock 164 is similar. The side lock assembly 400 includes the side clip 142 and the side lock 162. At least one of the side clip 142 and the side lock 162 may be made of material such as copper, aluminum, or an alloy of copper or aluminum.

The side clip 142 has a clip base 410 attached to the socket connector 120 and a first clip member 420 and a second clip member 430 extending from the clip base 410. The first clip member 420 has a terminal 425 for attaching to the printed circuit board 110. The attachment may be performed by soldering the terminal 425 directly to the PCB 110. The second clip member 430 is curved out, or bent outward, of the first clip member 420 so that it is spaced in parallel from the first member 420 to form an opening 432. While the first clip member 420 is mechanically rigid by virtue of its attachment to the PCB 110 via the terminal 425, the second clip member 430 may be allowed to extend slightly outward when pressed. As will be described later, the second clip member 430 has a curved member 435 that provides a snap-on action when a board is pressed down on the second clip member 430. The length of the opening 432 is limited by the length of the second clip member 430 and the width of the opening 432 is sufficiently wide to accommodate a lock member of the side lock 162 as described below.

The side lock 162 has a lock base 450 and first and second lock members 460 and 470 that extend from the lock base 450. The first and second lock members 460 and 470 form a slot 465. The length of the slot 465 is limited by the lengths of the first and second lock members 460 and 470 and fits the length of the second clip member 430. The width of the slot 465 is sufficiently wide to accommodate the width of the second clip member 430.

FIG. 4B is a diagram illustrating a side lock assembly 400 in fully inserted state according to one embodiment. The side lock assembly 400 is in fully inserted state when the side lock 162 is inserted into the side clip 142. When this occurs, the first and second lock members 460 and 470 flank the second clip member 430 such that the second clip member 430 fits into the slot 465 and the first lock member 460 fits into the opening 432. In this state, the first and second lock members 460 and 470 flank the second clip member 430 and the first and second clip members 420 and 430 flank the first lock member 460. The four members of the side clip 142 and the side lock 162 therefore form a double fitting which provides mechanical stability and firmly secures the side lock 162 to the side clip 142. Since the side clip 142 is secured to the PCB 110 via the terminal 425 and the socket connector 120, the side lock 162 is in turn mechanical secured to the PCB 110 and the socket connector 120.

The side lock assembly 400 provides a means to secure a metal sheet such as the heat sink 150 onto the PCB 110 by a fastener such as a screw. The lock base 450 has a hole 455 (FIG. 4A) to accommodate such a fastener to secure a metal sheet (e.g., top element 220 of the heat sink 150). In one embodiment, the dimensions of the side lock 162 are as follows: Overall length $L_1$ is approximately 16 mm; length $L_2$ of the lock base 450 is approximately 8 mm; width W is approximately 2.5 mm; the width of the slot 465 is approximately 0.5 mm; the height of the lock base 450 is approximately 3.25 mm and the height of the first and second lock members 460 and 470 is approximately 2.5 mm.

The side lock assembly 400 also provides a means to secure a board such as the memory module 130 firmly inserted into the socket connector 120. To provide such a means, the second clip member 430 of the side clip 142 has the curved member 435 on top to allow a board pressing down by an expanding spring action and to constrain the board underneath the curved member 435 by a return spring action. In other words, as a board (e.g., memory module 130) is initially inserted into the socket connector 120, it is at a slanted angle. The board is then pressed down onto the side lock assemblies 400 and acts upon the curved member 435 (on both side lock assemblies). This force causes the second clip member 430 to extend slightly outward by an expanding spring action. As the board continues to be pressed down, it passes the curved member 435 and allows the curved member 435 to spring back by a return spring action in a snap-on action. The curved member 435 thus constrains the board underneath it. This further secures the board firmly in place on the PCB 110 and the socket connector 120.

Figure 5A:
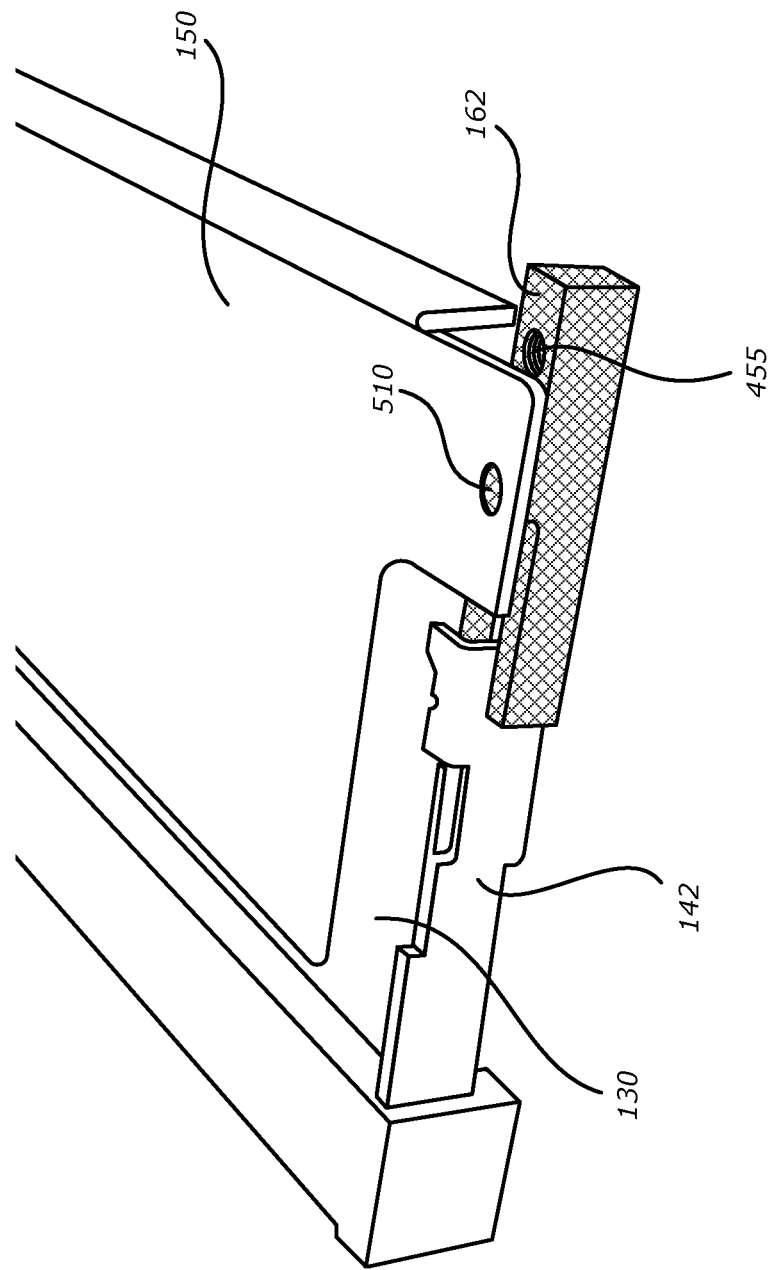
FIGS. 5A, 5B, and 5C illustrate a sequence of operations to install the side lock assembly according to one embodiment.
Figure 5B:
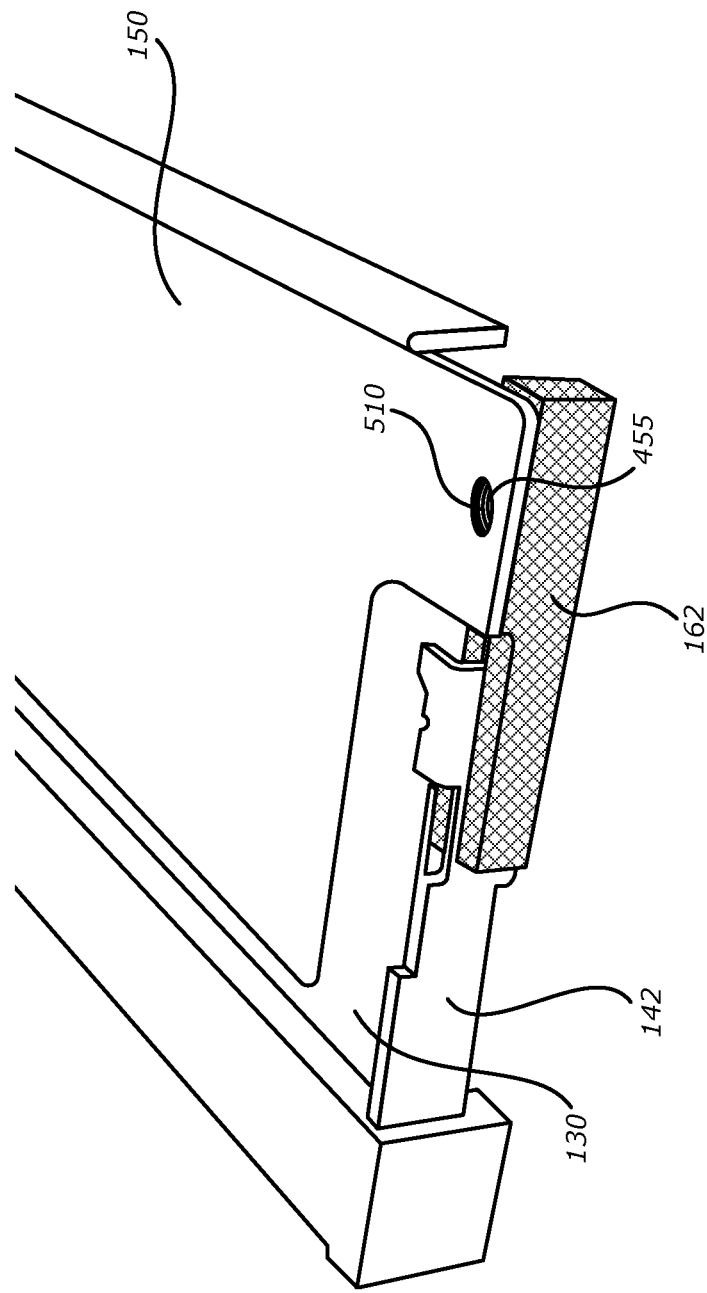
Figure 5C:
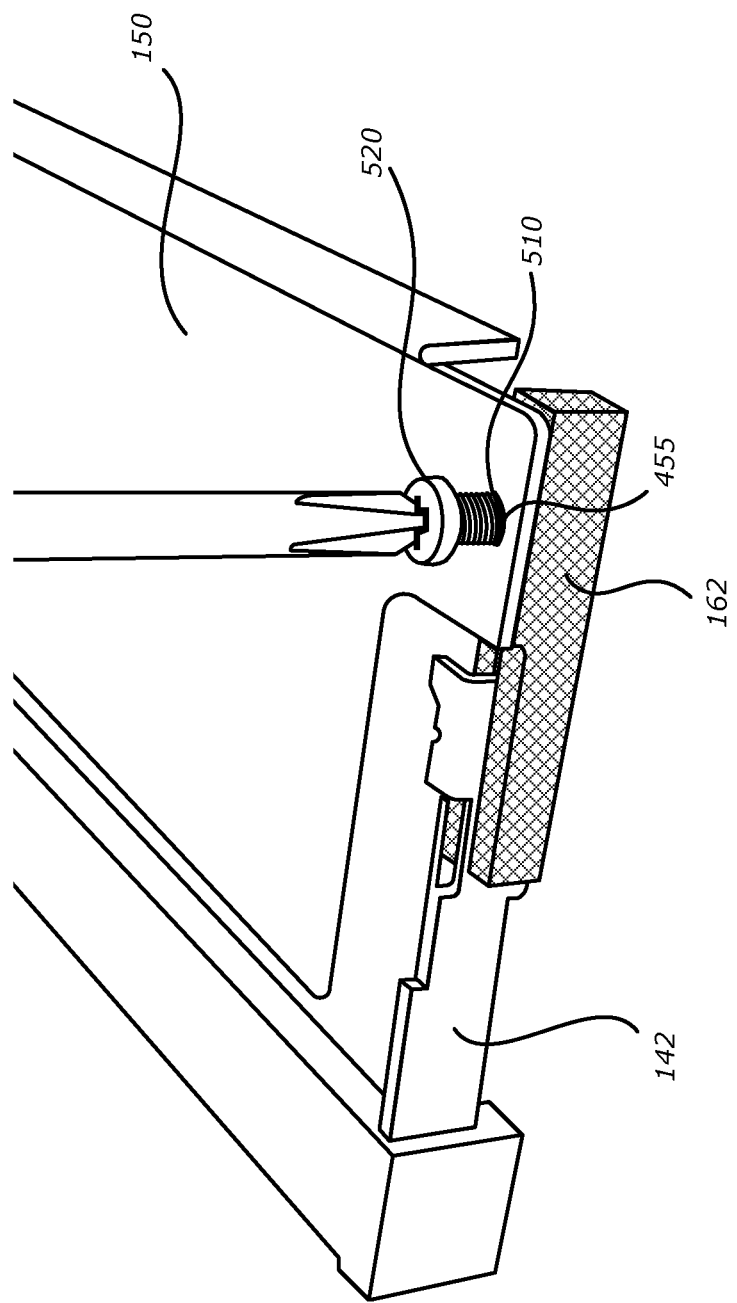

FIGS. 5A, 5B, and 5C illustrate a sequence of operations to install the side lock assembly according to one embodiment.

In FIG. 5A, the memory module 130 has been inserted into the socket connector 120 and is held in place by the side clip 142. The side lock 162 is aligned to mate with the side clip 142 by aligning the first and second lock members 460 and 470 with the opening 432. The top element of the heat sink 150 has a hole 510. In FIG. 5B, the side lock 162 is slid into the side clip 142. The first and second lock members 460 and 470 flank the second clip member 430 and the first and second clip members 420 and 430 flank the first lock member 460. In addition, the hole 455 on the lock base 450 is aligned with the hole 510 of the top element 230 of the heat sink 150. In FIG. 5C, the side lock 162 is firmly secured to the top element 230 by a screw 520 that attaches the side lock 162 to the top element 230 through the holes 455 and 510.

Side Retainer Assembly

In another embodiment, the memory module 130 and the heat sink 150 may be secured onto the socket connector 120 and the PCB 110 by a side retainer assembly.

Figure 6:
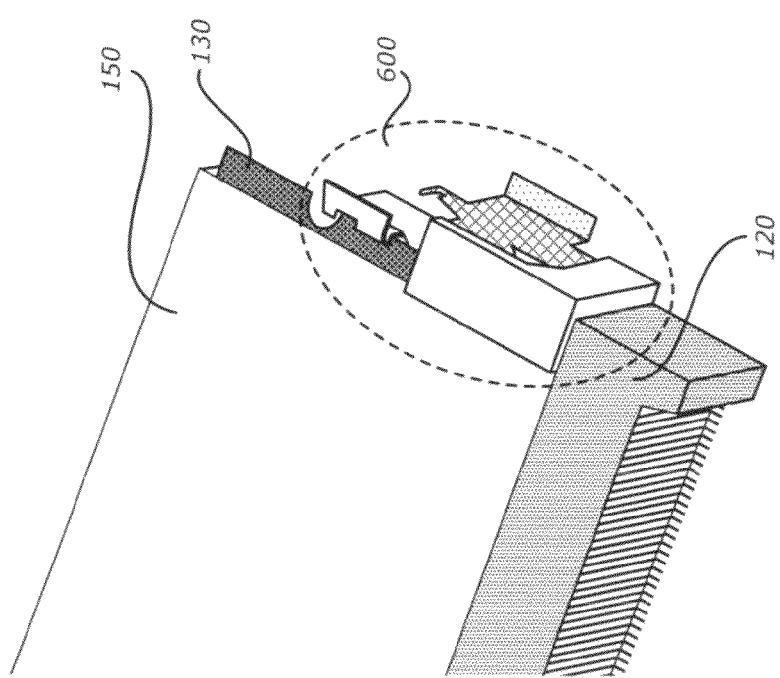
FIG. 6 is a diagram illustrating a side retainer assembly securing the heat sink and the memory module according to one embodiment.

FIG. 6 is a diagram illustrating a side retainer assembly securing the heat sink and the memory module according to one embodiment. The heat sink and the memory module are secured by two side retainer assemblies, one of the left and one on the right. For simplicity and clarity, only one side of the heat sink and memory module is shown.

In this embodiment, the top element 220 of the heat sink 150 does not have the lips 172 and 174 as shown in FIG. 1. Instead, the top element 220 has a shape of a rectangle. The memory module 130 is inserted into the socket connector 120 and is held firmly by a side retainer assembly 500. The memory module 130 has a hole (not shown) that is inserted by a member of the side retainer assembly 600 as described later.

Figure 7:
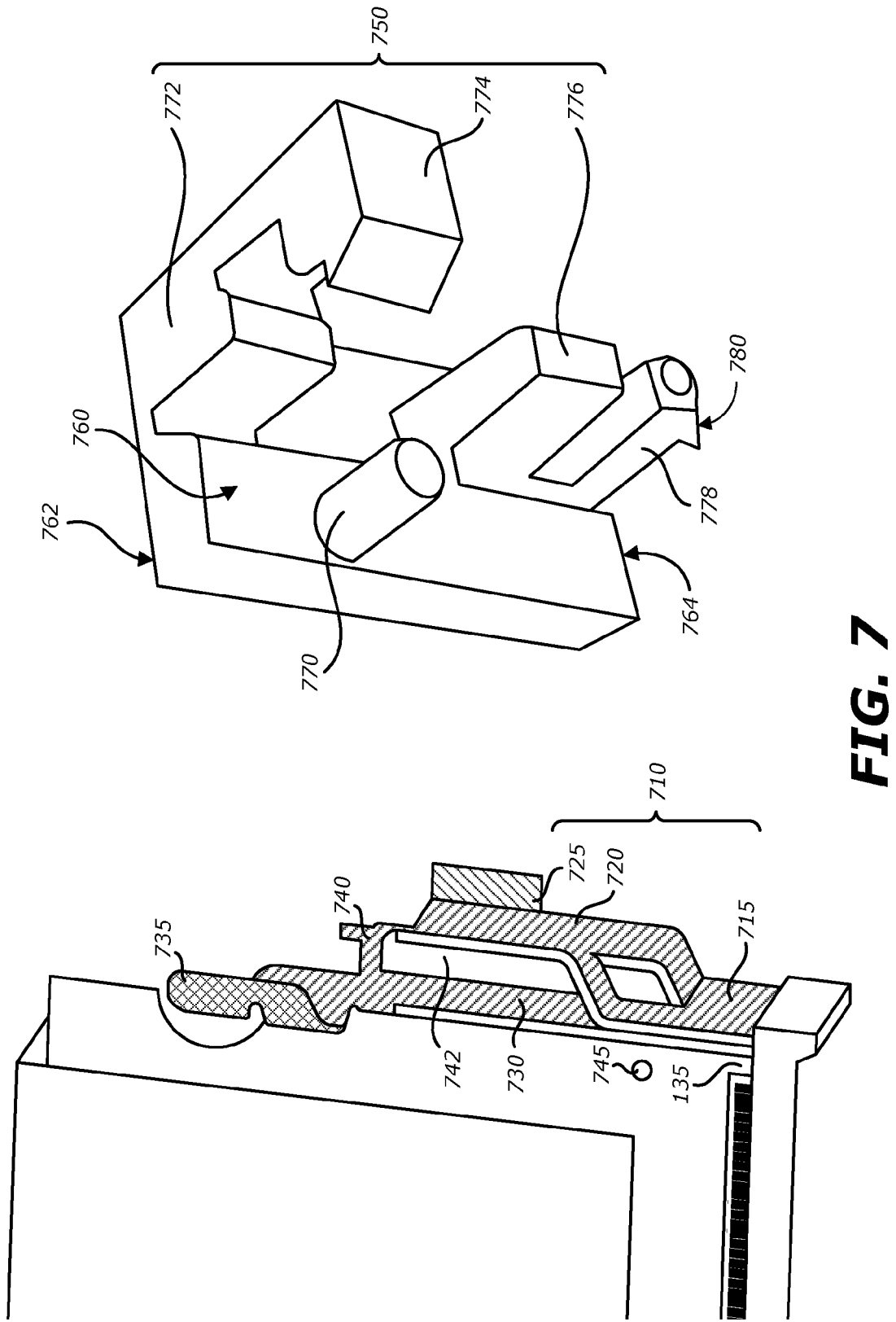
FIG. 7 is a diagram illustrating the side retainer assembly according to one embodiment.

FIG. 7 is a diagram illustrating the side retainer assembly 600 according to one embodiment. The side retainer assembly 600 includes a side clip 710 and a side retainer 750.

The side clip 710 is used to hold or guide the memory module 130. It may be made of aluminum or copper. The side clip 710 has a clip base 715, a first clip member 720 and a second clip member 730. The clip base 715 is attached to the socket connector 120 by inserting into a notch of the socket connector. The first and second clip members 720 and 730 extend from the clip base 715. All three components 715, 720 and 730 are integral as an integrated unit. The first clip member 720 is curved out, or bent outward, of the second clip member 730. The first clip member 720 has a terminal 725 at the bottom for attaching to the PCB 110. The attachment may be made by direct soldering to the PCB 110. The height of the first clip member 720 typically corresponds to the distance between the memory module 130 and the PCB 110 when the memory module 130 is firmly in place and fully inserted into the socket connector 120. The first clip member 720 is spaced in parallel from the second clip member 730 and connected to the second clip member 730 by a distal segment 740 to form an opening 742. While the first clip member 720 is firmly secured onto the PCB 110 by virtue of the terminal 725 being attached to the PCB 110, the second clip member 730 may have slight movement through spring action. Similar to the second clip member 430 described above, the second clip member 730 has a curved member 735 to allow a board (e.g., the memory board 130) pressing down by an expanding spring action and to constrain the board underneath the curved member 735 by a return spring action. The memory board 130, therefore, is secured by the second clip member 730 by a snap-on action as it is inserted into the socket connector 120 in a similar manner as with the second clip member 430 described above.

The side retainer 750 has a retainer base 760 and first, second, third, and fourth retainer members 770, 772, 776 and 778, respectively. The first, second, third, and fourth retainer members 770, 772, 776 and 778 extend vertically from the retainer base 760. Typically, the retainer base 760 has a rectangular shape having two side ends 762 and 764. The first retainer member 770 has a cylindrical shape to fit a hole 745 on the memory board 130 held by the side clip 710. It is located at a distance from the end 762 which is approximately equal to the distance between a side 135 of the connector 120 and the hole 745 so that when the first retainer member 770 is inserted into the hole 745, the end 762 touches the side 135 of the connector 120.

The second retainer member 772 is located at the end 762 of the retainer base 760. It has a notch with a height approximately equal to the height of the clip base 715 and an inward hook 774. The second retainer member 772 may have a spring action to be pushed slightly outward when it is pressed down along the clip base 715 when the side retainer 750 is inserted in place to mate with the side clip 710. When the first retainer member 770 is inserted into the hole 745 and the second retainer member 772 is pressed down, the second retainer member 772 is pushed slightly outward. As the second retainer member 772 is pressed past the clip base 715, the hook 774 springs back in a snap-on action to hook onto the end of the side of the clip base 715 to firmly secure the memory board 130. The third retainer member 776 is located at a distance from the end 764 such that when the first retainer member 770 is inserted into the hole 745, it fits in the opening 742. The fourth retainer member 778 is located on the end 764 of the retainer base 760 and having an outward hook 780 to hook onto the distal segment 740 of the side clip 710.

The first, second, third, and fourth retainer members 770, 772, 776, and 778 firmly retain the memory board 130 in three dimensions Z, X, and Y. The first retainer member 770 retains in the Z direction; the second retainer member 772 retains in the X dimension; the third retainer 776 retains in the Y dimension; and the fourth retainer 778 retains in the X dimension to further reinforce the secure action.

Figure 8A:
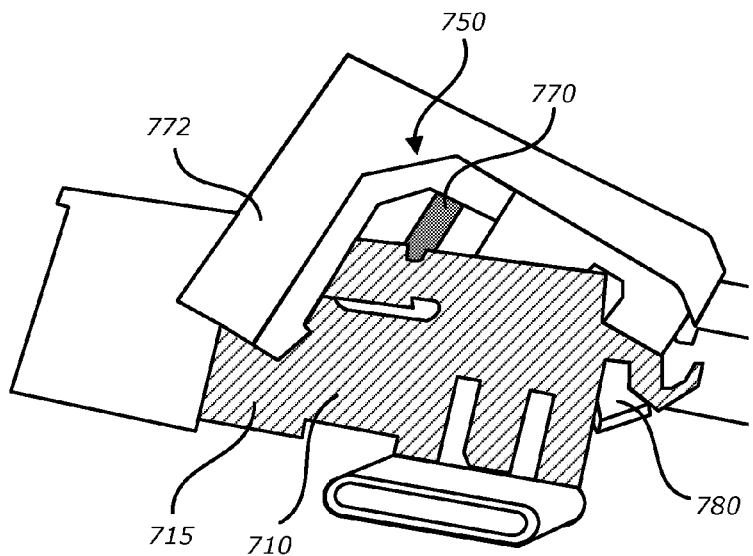
FIGS. 8A, 8B, and 8C illustrate a sequence of operations to install the side retainer assembly according to one embodiment.
Figure 8B:
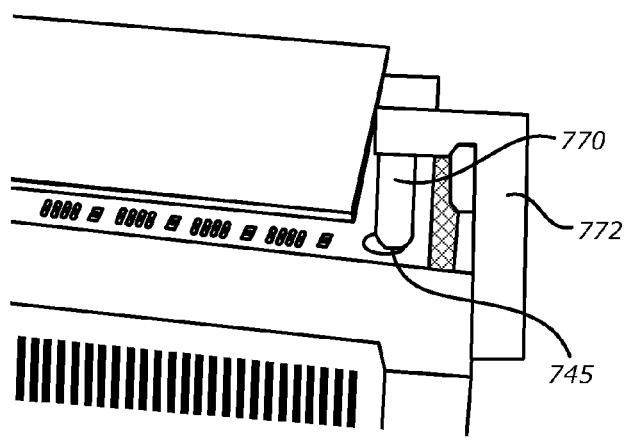
Figure 8C:
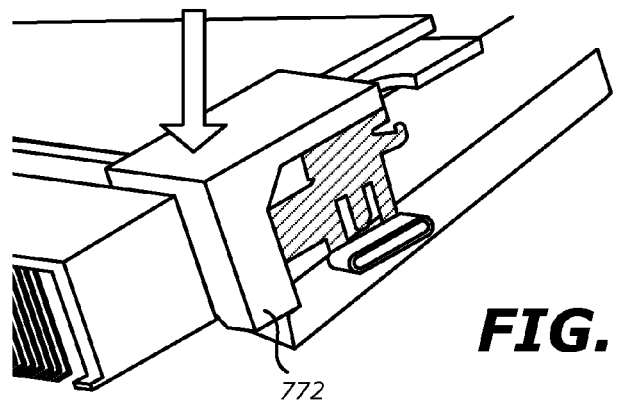

In one embodiment, the side retainer is made of polycarbonate, or any other polymer material that is rigid enough to provide ruggedized retaining FIGS. 8A, 8B, and 8C illustrate a sequence of operations to install the side retainer assembly according to one embodiment. In FIG. 8A, the side retainer 750 is positioned on top of the side clip 710. The fourth retainer member 778 is position to hook to the distal segment 740 by the hook 780. In FIG. 8B, the first retainer member 770 is positioned to be ready to be inserted into the hole 745 of the memory module. In FIG. 8C, the second retainer member 772 is pressed down. The first retainer member 770 is fully inserted into the hole 745 while the hook 774 on the second retainer member 772 hooks onto the bottom side of the clip base 715 in a snap-on action.

Insertion Tool

In many applications, it is desired to achieve high mechanical stability for the heat sink and the memory module assembly. Even when the heat sink is not used, it is also useful to assemble the memory module, or any other printed circuit board (PCB) firmly into the socket connector.

Figure 9A:
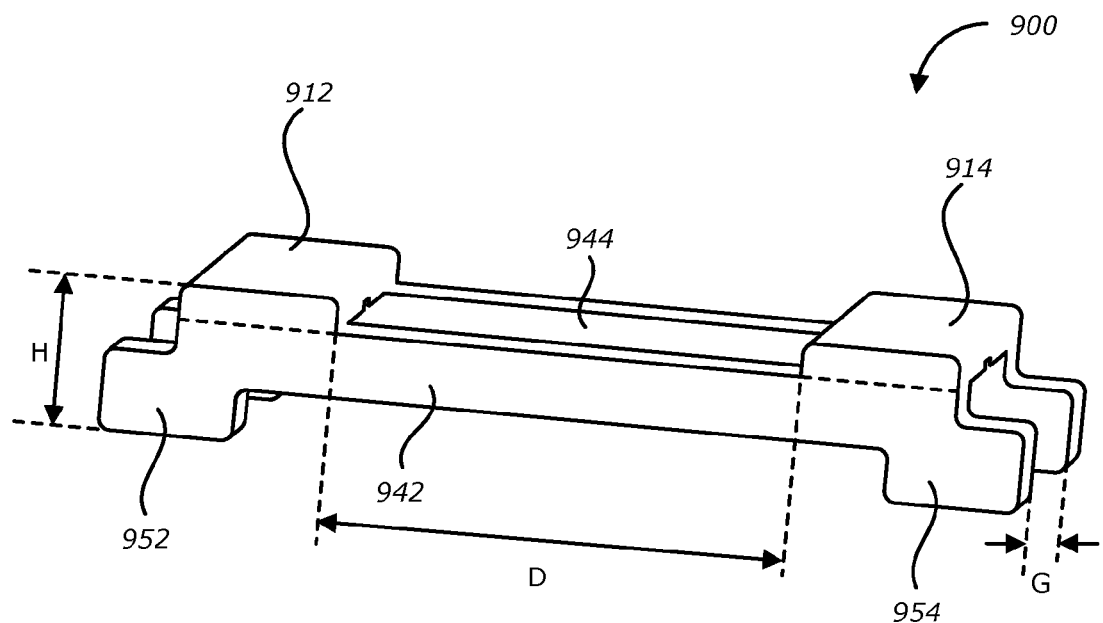
FIGS. 9A and 9B illustrate views of an insertion tool for the memory module according to one embodiment.
Figure 9B:
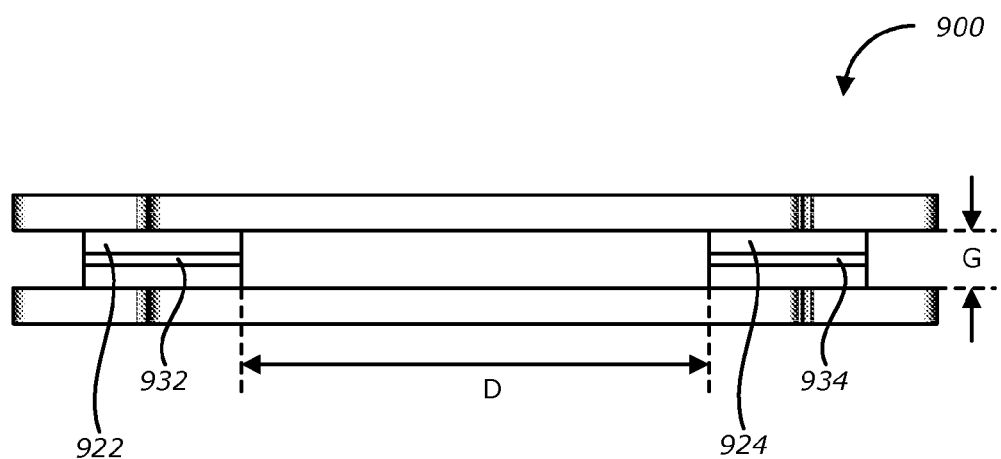

FIGS. 9A and 9B illustrate views of an insertion tool for the memory module according to one embodiment. The insertion tool 900 may be used to provide a more uniform application of insertion force to press the PCB into the socket connector. This may be achieved by distributing the application force over the entire length of the PCB so that the PCB is inserted into the slot or the opening inside the socket connector evenly. The insertion tool 900 may be used manually by a human operator or automatically by a machine.

The insertion tool 900 may be formed in an integrated manner by molding or by assembling parts together. In its basic form, the insertion tool 900 may include spacers and guides. The spacers provide contact for an insertion force exerted by an operator or by an actuator of a machine. They also define the space to accommodate the PCB and the socket connector when the PCB is inserted into the socket to make contacts with the fingers. The guides allow alignment of the PCB and the socket connector so that the insertion force can be applied and push the PCB straight into the slot of the socket connector.

The insertion tool 900 includes first and second spacers 912 and 914 and corresponding guides 942 and 944. The first and second spacers 912 and 914 may be located from each other at a predetermined distance D. The sum of this predetermined distance D and the length of the spacers is L and may match the length of the PCB. In one embodiment, this predetermined distance D may be fixed. In another embodiment, this predetermined distance D may be adjustable to accommodate a variety of PCB lengths. In one embodiment, D=70 mm±0.5 mm and L=120±1 mm, and the overall length of the insertion tool is approximately 140 mm±1 mm. Each of the spacers has a flat top surface 912/914 and a bottom surface 922/924 with a longitudinal opening 932 or 934 having a narrow width $T_P$ that accommodates a first thickness of a printed circuit board (PCB). In one embodiment, the width $T_P$ is 1.4 mm±0.1 mm. The longitudinal opening 932/934 runs the entire length of the spacers. It may be a slot or groove with a depth sufficiently deep to hold the edge of the PCB firmly during the insertion. In one embodiment, this depth may be 0.2 mm±0.05 mm. The flat top surface 912/914 has an area that accommodates an actuator for pressing down. The actuator may be a thumb of an operator (for manual insertion) or a mechanical, electric, electro-mechanical, or electro-magnetic actuator that is actuated by a machine (for machine or automatic insertion). The first and second spacers 912 and 914 are located at the predetermined distance D to provide a see-through top 960. The see-through top 960 allows a visual inspection of the PCB assembly and the connector from the top down when the tool is applied to the PCB to exert an insertion force on the PCB.

The first and second guides 942 and 944 are attached on two sides of the spacers 912 and 914 such that the spacers 912 and 914 act like a bridge that connect the first and second guides 942 and 944 on two ends. The attachment of the first and second guides 942 and 944 to the spacers 912 and 914 may be made by integrated the first and second guides 942 and 944 to the spacers 912 and 914 altogether such as by molding, or may be made by fixed or adjustable attachment elements. Examples of these attachments elements may be snap-on insertable slots, screws, etc.

Each of the first and second guides 942 and 944 has two end portions 952 and 954 that extend downward by a height H and are attached to sides of the first and second spacers 912 and 914, respectively, such that a guide distance G between the first and second guides corresponds to a combined thickness of the first thickness $T_P$ and side thicknesses $T_s$ of a socket connector into which the PCB is inserted. In other words, the socket connector has a slot having size that accommodates the PCB of thickness $T_P$. Flanking the slot are two sides with contact elements (e.g., finger elements on edge) that match with contact elements on the PCB. Each of the two sides flanking the slot has a thickness of $T_s$. The guide distance G between the two guides 942 and 944 is large enough of fit the combined thickness of the PCB and the two sides. In other words, G is slightly larger than $2T_s+T_P$. As will be explained later, by having the guide distance G that can accommodate the combined thickness of the PCB and the sides of the connector, the insertion tool 900 may provide a guiding and/or alignment so that the PCB may be forced to be fully inserted into the socket in a stable manner without mechanical deviation. In one embodiment, the guide distance G is 7.75 mm±0.05 mm to accommodate the thicknesses $T_P$=1.4 mm±0.1 mm and $T_s$=3.18 mm±0.1 mm.

The height H of the two end portions 952 and 954 is approximately equal to the width W of the PCB (FIG. 10A) so that the guides 942 and 944 do not go past the connector and may touch the platform. Typically, the height H of the two end portions 952 and 954 of each of the first and second guides 942 and 944 extends at least past the upper edge of the socket connector when the PCB is inserted into the connector while being fully pressed inside the longitudinal opening of the first and second spacers. In one embodiment, H=23 mm±0.1 mm.

FIGS. 10A, 10B, 10C, 10D, and 10E illustrate a sequence of operations to insert a PCB 1010 into a socket connector 1030 according to one embodiment. The operations may be performed manually or automatically by a machine.

Figure 10A:
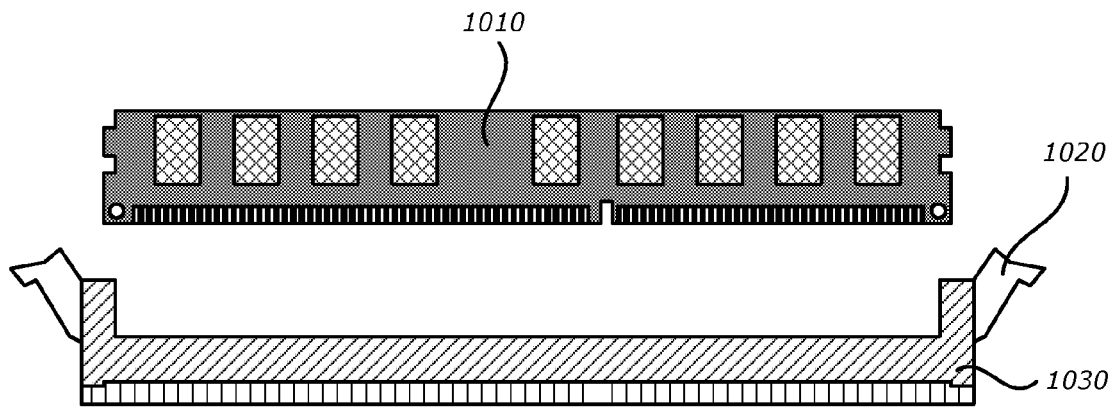
FIGS. 10A, 10B, 10C, 10D, and 10E illustrate a sequence of operations to insert a printed circuit board into a socket connector according to one embodiment.

In FIG. 10A, the PCB 1010 is aligned with the connector 1030 so that the edge of the PCB is aligned with the slot inside the connector 1030. The PCB 1010 may be a board that contains populated devices such as a memory module 130 (FIG. 1). It has a length $L_P$ and a width W. The length $L_P$ is may be the same or longer than the length L of the insertion tool 900 shown in FIG. 9B. The socket connector 1030 may have guide clamps 1020 on two ends of the connector to keep the PCB in place when inserted into the connector. As discussed above, the socket connector 1030 has a slot sized to accommodate the thickness $T_P$ of the PCB 1010 and two sides flanking the slot having thickness $T_S$.

Figure 10B:
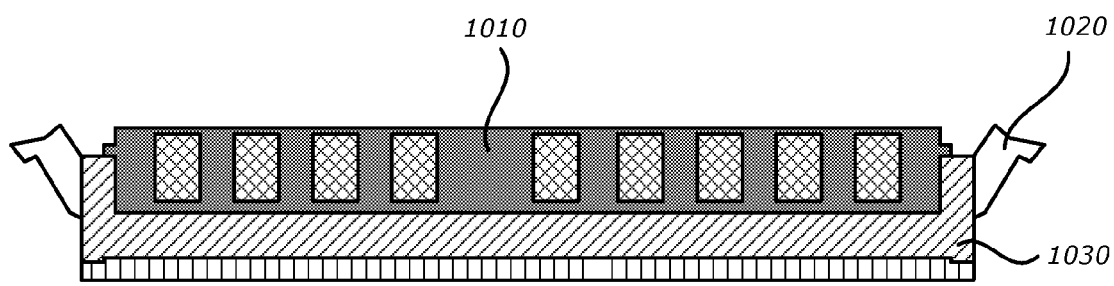
Figure 10C:
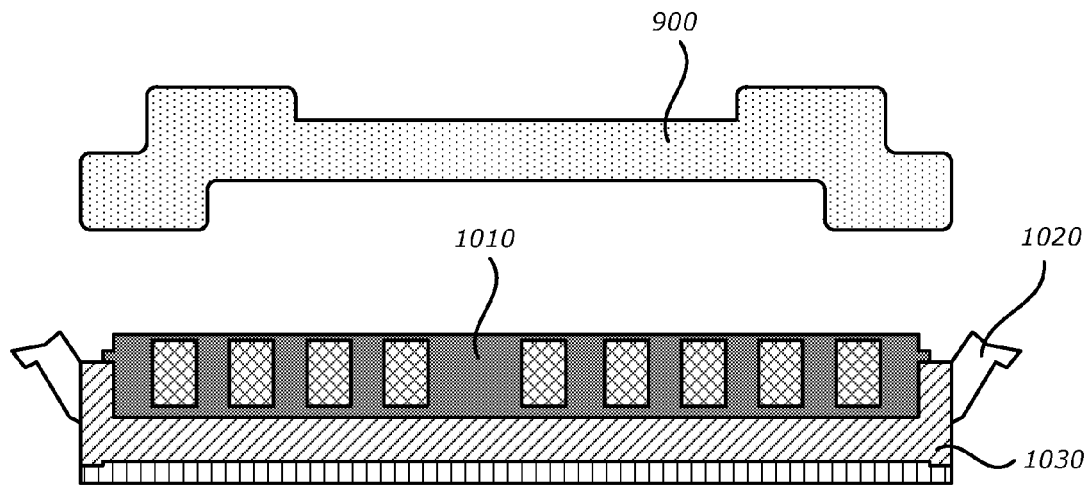

In FIG. 10B, the PCB 1010 is place on the slot of the connector 1030, ready to be inserted. In FIG. 10C, the insertion tool 900 is aligned with the top edge of the PCB 1010. The insertion tool 900 has first and second spacers as described earlier. The bottom surfaces of the spacers have a longitudinal opening with a narrow width that accommodates the PCB thickness. As discussed above, the first and second spacers are attached to, or integrated with, first and second guides at sides of the first and second spacers such that a guide distance between the first and second guides corresponds to a combined thickness of the PCB thickness and the side thicknesses of the socket connector.

Figure 10D:
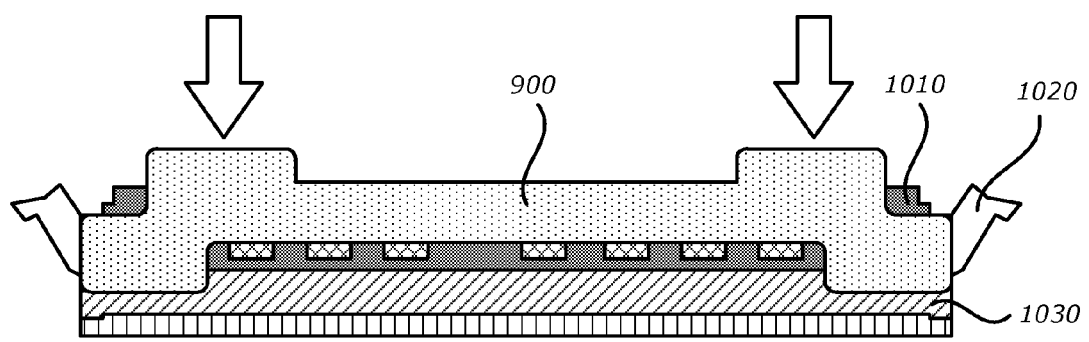
Figure 10E:
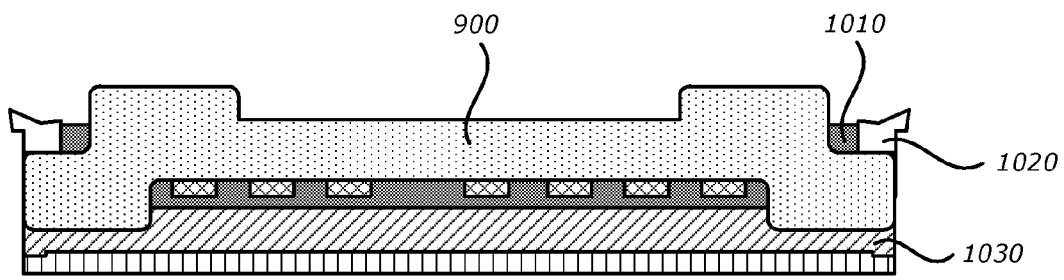

In FIG. 10D, an insertion force exerted by an actuator to press down on top surfaces of the first and second spacers such that the PCB is fully inserted into the slot of the socket connector. The actuator may be thumbs of an operator for a manual insertion or actuating element of a machine. The actuator presses down on top surfaces of the first and second spacers such that the height of the two end portions of each of the first and second guides extends at least past the edge of the socket connector when the PCB is inserted into the connector. By using the insertion tool 900 having the spacers locates at two ends, the insertion of the PCB into the connector 1030 may be made with little force and the force may be distributed evenly over the entire length of the PCB 1010 to provide an overall solid and firm insertion. In FIG. 10E, the guide clamps 1020 may be activated to snap onto the two sides of the PCB 1010 to keep the PCB 1010 in place. The guide clamps 1020 may then be removed so that other assembly components may be installed to secure the PCB 1010 to the connector 1030 or the platform. These assembly components may be the side lock assembly or the side retainer assembly components as discussed above in FIGS. 4 and 7.

Figure 11:
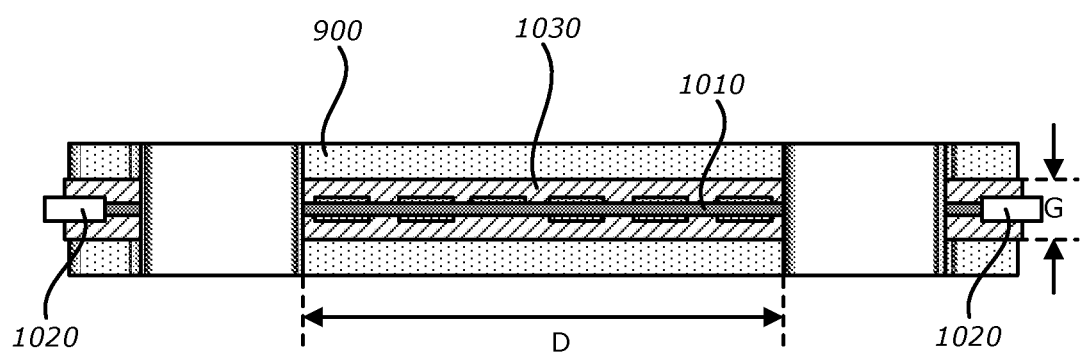
FIG. 11 illustrates the insertion tool when it is fully deployed with the printed circuit board being inserted into the socket connector according to one embodiment.

FIG. 11 illustrates the insertion tool as viewed from the top when it is fully deployed with the printed circuit board being inserted into the socket connector according to one embodiment. The insertion tool 900 is on top of the PCB 1010 and the see-through top 960 allows a visual inspection of the PCB 1010 and the connector 1030 underneath the insertion tool 900.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A side retainer assembly comprising:
   a side clip having a clip base attached to a socket connector and a first clip member and a second clip member extending from the clip base, the first clip member having a terminal for attaching to a printed circuit board, the second clip member being spaced in parallel from the first member and connected to the first clip member by a distal segment to form an opening; and
   a side retainer having a retainer base and first, second, third, and fourth retainer members extending vertically from the retainer base, the first retainer member fitting a hole on a memory board held by the side clip, the second retainer member located at a first end of the retainer base and having an inward hook to hook onto side end of the clip base, the fourth retainer member located on a second end of the retainer base and having an outward hook to hook onto the distal segment of the side clip.

2. The side retainer assembly of claim 1 wherein the second clip member has a curved member to allow the memory board pressing down by an expanding spring action and to constrain the memory board underneath the curved member by a return spring action.

3. The side retainer assembly of claim 1 wherein the side retainer is made of polycarbonate.

4. The side retainer assembly of claim 1 wherein the second retainer member has a spring action to allow the inward hook to hook onto the side end of the clip base in a snap-on action as the second retainer member is pressed down the clip base.

5. A board assembly comprising:
   a socket connector attached to a printed circuit board (PCB);
   a memory module inserted into the socket connector;
   a heat sink covering the memory module; and
   a side retainer assembly attached to the PCB to secure the memory module and the heat sink, the side retainer assembly comprising:
   a side clip having a clip base attached to the socket connector and a first clip member and a second clip member extending from the clip base, the first clip member having a terminal for attaching to the PCB, the second clip member being spaced in parallel from the first member and connected to the first clip member by a distal segment to form an opening, and a side retainer having a retainer base and first, second, third, and fourth retainer members extending vertically from the retainer base, the first retainer member fitting a hole on the memory module held by the side clip, the second retainer member located at a first end of the retainer base and having an inward hook to hook onto side end of the clip base, the fourth retainer member located on a second end of the retainer base and having an outward hook to hook onto the distal segment of the side clip.

6. The board assembly of claim 5 wherein the second clip member has a curved member to allow the memory module pressing down by an expanding spring action and to constrain the memory module underneath the curved member by a return spring action.

7. The side retainer assembly of claim 5 wherein the side retainer is made of polycarbonate.

8. The side retainer assembly of claim 5 wherein the second retainer member has a spring action to allow the inward hook to hook onto the side end of the clip base in a snap-on action as the second retainer member is pressed down the clip base.

* * * * *